Oct. 3, 1939.   C. R. KEISER ET AL   2,174,943
METHOD OF MAKING A RUBBER SOLE
Filed May 14, 1936
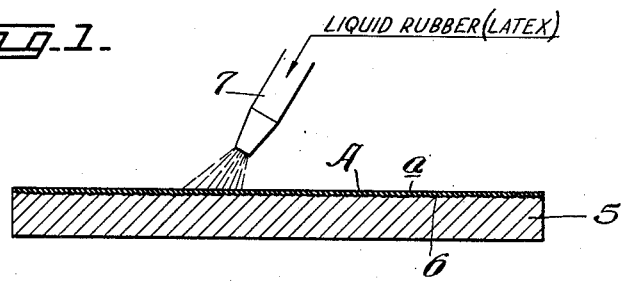
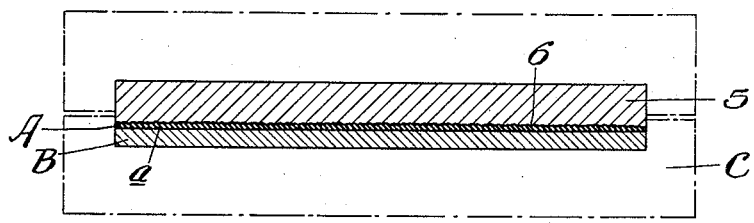
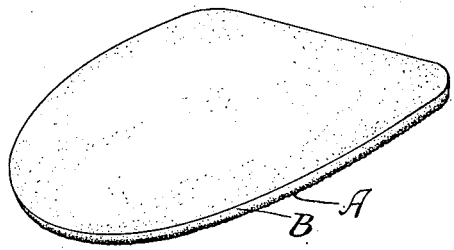
INVENTORS.
C. R. Keiser
J. R. Riker
BY
W. G. Doolittle
ATTORNEY Patented Oct. 3, 1939

2,174,943

UNITED STATES PATENT OFFICE 2,174,943

METHOD OF MAKING A RUBBER SOLE

Charles R. Keiser, Dayton, and Theodore R. Rike, West Alexandria, Ohio, assignors, by mesne assignments, to Rainbow Rubber Company, Butler, Pa., a corporation of Pennsylvania Application May 14, 1936, Serial No. 79,676

3 Claims. (Cl. 18—59)

This invention relates to a new and improved process for manufacturing a composite rubber article, as a rubber sole particularly designed for attachment to the soles of shoes or the like.

Prior to our invention rubber soles of the character of our invention have been commercially produced by the employment of a vulcanizable layer of rubber and the employment of one or more layers of non-vulcanizing rubber superimposed on the vulcanizable layer. The non-vulcanizable layer of raw rubber has been made from either raw milled rubber or raw non-milled rubber of sheet form, such as crepe, the raw non-milled rubber as well as the milled rubber employed being free of vulcanizing agents such as sulphur, etc.

Such rubber soles are made with an attaching surface on the non-vulcanizable portion of the sole that is normally sticky or tacky and readily susceptible to the action of solvents whereby the sole may be, by the use of rubber cement, directly and securely attached to the leather soles of shoes, etc., without the employment of nails or stitching.

In the practice of our invention we employ as heretofore a tread portion made of a suitable vulcanizable rubber stock, but in lieu of the sheet form of non-vulcanizing rubber stock we utilize a commercial liquid latex and treat this liquid latex in a specified manner prior to its application to the vulcanizable layer of the sole.

We find that by forming the non-vulcanizable layer or layers of the sole from a liquid latex in place of a sheet of milled raw rubber or a sheet of un-milled raw rubber, we are enabled to provide a backing for the vulcanizable rubber which has a greater heat resistance than is possible with the employment of the sheet milled or un-milled rubber. By the use of the liquid latex in place of the sheet material as heretofore, the expense of milling and calendering the raw rubber is eliminated and the thickness of the layer of non-vulcanizable rubber may be varied and controlled much more effectively than where sheet material is employed.

An object of our invention is to provide a new and improved method of producing rubber articles of the character noted involving the use of liquid latex, as distinguished from raw milled or un-milled raw rubber in sheet form, from which the unvulcanizable portion of the sole has heretofore been formed.

A further object is to provide a new and improved method of forming a rubber sole including a tread portion of vulcanizable rubber and an attaching unvulcanizable portion formed from liquid latex.

Other objects are, to provide a method of forming a composite rubber article comprising vulcanizable and unvulcanizable layers of rubber intimately joined together, wherein the unvulcanized layer or layers possess superior toughness and heat resistance, giving greater wearing and lasting qualities in use; to dispense with the use of sheet rubber in the production of the unvulcanized layer or layers thereby eliminating the cost of milling and calendering the raw rubber; and to provide a method of manufacture by which the thickness of the unvulcanized layer or layers may be selectively varied and controlled with maximum efficiency.

In the accompanying drawing which diagrammatically illustrates, an embodiment of our method and the product of our invention:

Fig. 1 is a sectional view illustrating the initial formation of a layer of unvulcanizable raw rubber by spraying liquid latex on the surface of a transfer member preparatory to the application of the same to the vulcanizable stock in the formation of the composite rubber article;

Fig. 2, a similar view, showing the manner of applying the unvulcanizable layer of Fig. 1 to a vulcanizable layer of rubber during the vulcanizing operation, the vulcanizing mold being shown by broken lines;

Fig. 3, a sectional view of the completed composite rubber article; and

Fig. 4, a perspective view of a composite rubber shoe sole formed in accordance with our invention.

In the practice of our invention we employ a transfer member or plate 5 of the desired size, which member may be formed of any suitable material, preferably having a plane roughened fibre surface 6. Upon the surface 6 of such member we apply liquid latex by any suitable means, such as the pressure spray 7 shown, or by spreading the liquid latex with a brush, spatula, or the like.

The raw liquid latex thus applied is substantially free of vulcanizing agents and therefore forms a coating or layer A of unvulcanizable rubber. The number of coats or applications and rubber content of the latex may be varied at will to produce a layer A of the desired thickness.

The formed layer A is retained on its transfer member and is dried either by natural or artificial heat, whereby the said layer attains an excellent hardness and toughness which are an aid to heat resistance.

After drying, the exposed surface a of the layer A, may then be treated with a rubber solvent, such as benzol, or more preferably some solvent containing a small amount of rubber in solution, for the purpose of softening the surface a of the dried latex; this conditioning of the latex preparatory to its application to the vulcanizable rubber layer B aids in effecting a highly efficient bond between the vulcanizable and the nonvulcanizable stocks during the vulcanization operation.

Next, the transfer member 5 with its applied raw latex layer A is applied to a layer or sheet B of prepared vulcanized or vulcanizable rubber, with the tacky face a of the layer A in contact with the said vulcanizable layer B, and preferably the entire assembly is placed in a suitable mold C and vulcanized under heat and pressure in the usual vulcanizing press.

Upon the completion of the vulcanizing operation, the transfer member is stripped or removed from the resulting product for reuse. The product or article so produced is a composite sheet of vulcanized and unvulcanized layers of rubber intimately joined together, and of the character readily employed for use in the aforementioned rubber shoe soles, as shown in Fig. 4.

As will be readily understood, articles of the character of the shoe soles may be individually molded in the manner herein described, whereby the unvulcanized rubber latex layer A will afford a surface readily attachable to the leather sole of a shoe. Or if desired, the rubber product contemplated herein may be produced in large sheets as stock, from which the desired individual articles may be made.

We claim:

1. The method of forming a composite rubber sole or the like, consisting in diffusing a coherent layer of liquid latex in non-vulcanizable condition onto the surface of a transfer member, drying the layer on the transfer member, applying the transfer member to a blank of vulcanizable rubber with the dried latex layer in contact with a surface of said blank, subjecting the assembly to vulcanizing heat and pressure uniting the latex layer with the vulcanizable rubber while retaining the transfer member in adherence with the latex layer for subsequent removal thereof.

2. The method of forming a composite rubber sole or the like, consisting in diffusing a coherent layer of liquid latex in non-vulcanizable condition onto the surface of a fibrous transfer member, drying the layer on the transfer member, applying the transfer member to a blank of vulcanizable rubber with the dried latex layer in contact with a surface of said blank, subjecting the assembly to vulcanizing heat and pressure uniting the latex layer with the vulcanizable rubber while retaining the transfer member in adherence with the latex layer for subsequent removal thereof.

3. The method of forming a composite sole including a fibrous transfer member capable of being removed therefrom incidental to attachment to an article, which method consists in diffusing a coherent film of liquid latex in non-vulcanizable condition onto a roughened face of said transfer member, drying said film while on the transfer member, disposing the said film while on the transfer member in contiguous relation to a blank of vulcanizable rubber, and subjecting the assembly to heat to vulcanize the film to the blank.

CHARLES R. KEISER.
THEODORE R. RIKE.